United States Patent [19]
Moll

[11] Patent Number: 5,116,076
[45] Date of Patent: May 26, 1992

[54] WHEEL SUSPENSION SYSTEM FOR STEERABLE REAR WHEELS OF MOTOR VEHICLES

[75] Inventor: Patrick Moll, München, Fed. Rep. of Germany

[73] Assignee: Dr. Ing. h.c.F. Porsche AG, Fed. Rep. of Germany

[21] Appl. No.: 626,456

[22] Filed: Dec. 12, 1990

[30] Foreign Application Priority Data

Dec. 13, 1989 [DE] Fed. Rep. of Germany ....... 3941083

[51] Int. Cl.⁵ .................................................. B60G 3/00
[52] U.S. Cl. ...................................... 280/691; 280/91; 280/673
[58] Field of Search ................... 280/96.1, 91, 99, 103, 280/693, 690, 691, 661, 675, 673

[56] References Cited

U.S. PATENT DOCUMENTS

| | | | |
|---|---|---|---|
| 4,545,602 | 10/1985 | Shibahata | 280/675 |
| 4,610,455 | 9/1986 | Furukawa et al. | 280/91 |
| 4,709,936 | 12/1987 | Tashiro et al. | 280/95.1 |
| 4,744,586 | 5/1988 | Shibahata et al. | 280/691 |
| 4,756,546 | 7/1988 | Kubo et al. | 280/661 |
| 4,815,762 | 3/1989 | Jurr | 280/91 |
| 4,878,688 | 11/1989 | Kubo | 280/691 |

FOREIGN PATENT DOCUMENTS

| | | |
|---|---|---|
| 0278095 | 12/1987 | European Pat. Off. . |
| 0277649 | 2/1988 | European Pat. Off. . |
| 3630984 | 3/1987 | Fed. Rep. of Germany . |
| 3642421 | 6/1987 | Fed. Rep. of Germany . |
| 3703199 | 4/1988 | Fed. Rep. of Germany . |
| 3703198 | 5/1988 | Fed. Rep. of Germany . |
| 3736229 | 9/1988 | Fed. Rep. of Germany . |
| 3809278 | 9/1988 | Fed. Rep. of Germany . |
| 3728594 | 3/1989 | Fed. Rep. of Germany ........ 280/91 |
| 3729238 | 3/1989 | Fed. Rep. of Germany . |
| 2177983 | 2/1987 | United Kingdom . |
| 2180206 | 3/1987 | United Kingdom . |

OTHER PUBLICATIONS

Report on the 6th International Technical Conference of Experimental Safety Vehicles–U.S. Dept. of Transportation.

*Primary Examiner*—Charles A. Marmor
*Assistant Examiner*—Paul Dickson
*Attorney, Agent, or Firm*—Evenson, Wands, Edwards, Lenahan & McKeown

[57] ABSTRACT

A wheel suspension system for steerable rear wheels of a motor vehicle, having a double-wishbone construction. An upper wheel suspension element and a lower wheel suspension element comprise an A-frame arm arrangement and an opened-up A-frame arm arrangement. A rod link is assigned either to the upper or lower suspension link, and one of the control arms or the rod link is connected with at least one control cylinder for the steering of the rear wheels.

9 Claims, 4 Drawing Sheets

WHEEL SUSPENSION SYSTEM FOR STEERABLE REAR WHEELS OF MOTOR VEHICLES

BACKGROUND AND SUMMARY OF THE INVENTION

The invention relates to a wheel suspension system for steerable rear wheels of a motor vehicle.

Rear wheel suspension systems of the generic type are known. For example, German Patent Document DE-OS 36 30 984, discloses an arrangement in which an arm connected at one end with the wheel carrier extends in the longitudinal direction of the vehicle, and is connected at its other end with a hydraulically operable adjusting element. The wheel carrier is pivotally supported between joints of transversely aligned control arms which are held on the vehicle body side. In such an arrangement, because of the arm connected with the wheel carrier, the position of the adjusting element is fixed with respect to the vehicle, and can be changed only at a relatively high cost.

Due to space limitations (and also for kinematic and elastokinematic reasons), it may be necessary, particularly in the case of a double wishbone axle having an additional separate rod link, that the adjusting element not be connected directly with the wheel carrier.

It is therefore an object of the present invention to provide a wheel suspension for steerable rear wheels of motor vehicles in which direct control of a wheel suspension link is made possible for achieving a rear-wheel locking angle. This object is achieved according to the invention, in a double-wishbone suspension system wherein the wheels are adapted to react resiliently as a result of longitudinal or lateral forces and which, at the same time, can be controlled for the adjustment of a rear wheel steering angle by way of an adjusting element, such as a hydraulic control cylinder, a motor operator or similar devices. The two wishbones arranged in planes situated above one another, are pivotally connected to the wheel carrier as well as to the vehicle body and, either in the lower plane or in the upper plane, are supplemented by an additional rod link. The arrangement of the wheel suspension links and bearing members is such that a resilient rotating axis is established outside the wheel center longitudinal plane and- with respect to the driving direction—behind the wheel center transverse plane. (The words "front", "rear" and "behind" are used herein relative to the forward driving direction F as shown in FIG. 1.) Under the influence of outside forces and torques in the wheel contact area, the wheel rotates around this axis in the wheel contact surface. The extent of the rotation, for example in the case of a bump toe-in, is essentially a function of the elasticity of a control bearing between the adjusting element and a control arm, and the elasticity of the additional rod link. The control bearing also has an advantageous effect on the active adjustment of the rear-wheel locking angle by way of the adjusting element and, for this purpose, has a correspondingly defined marking.

Depending on the construction of the double-wishbone axle and the connection of the adjusting element with one of the control arms, a corresponding active center of rotation for the wheel is disposed either in the intersecting point of the longitudinal axes of the control arms of the wheel suspension links or directly in the wheel-carrier-side joint of the wheel suspension link. As noted previously, the passive center of rotation of the wheel suspension system is determined by the elastic swivel axis and by the wishbones.

Other objects, advantages and novel features of the present invention will become apparent from the following detailed description of the invention when considered in conjunction with the accompanying drawings.

DETAILED DESCRIPTION OF THE DRAWINGS

Figure 1:
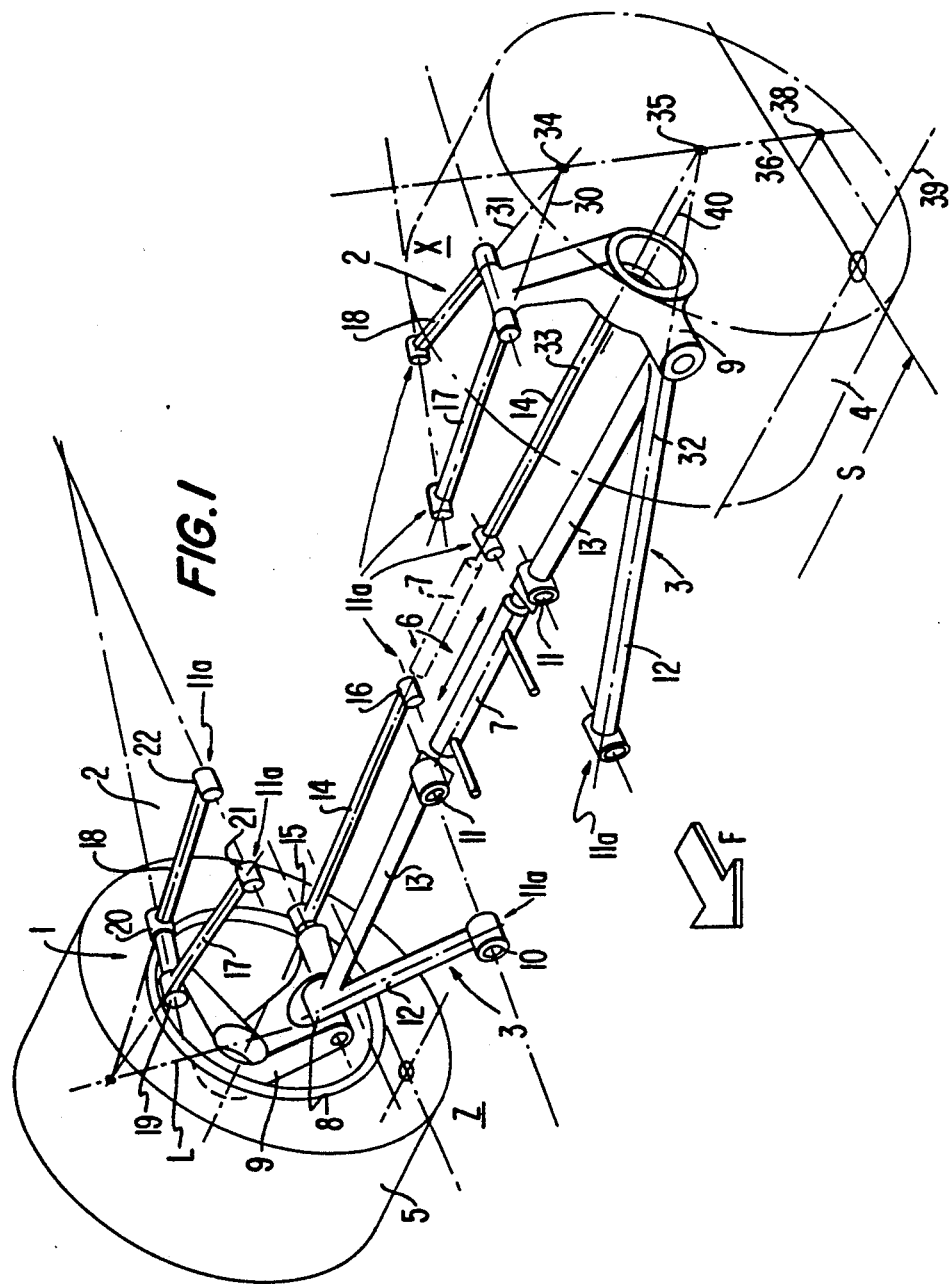
FIG. 1 shows a double-wishbone wheel suspension system having an upper opened-up A-frame arm arrangement and a lower A-frame arm arrangement with a rod link.

As depicted in FIG. 1, the rear-wheel suspension system 1 of a motor vehicle comprises two wheel suspension links 2, 3 arranged in two planes X and Z disposed above one another and constructed in the manner of a double wishbone. For the steering of the rear wheels 4 and 5, a steering device 7, including an actuator element 6, is connected with the wheel suspension system 1.

According to the first embodiment in FIG. 1, the lower wheel suspension link 3 consists of an A-frame arm arrangement which has two control arms 12 and 13 and is coupled to the wheel carrier 9 by a single joint 8 and, to the vehicle body by two joints 10 and 11 or 11a. Next to the A-frame arm arrangement 12, 13, a rod link 14 is arranged in an approximately identical horizontal plane and is pivotally connected with the wheel carrier 9 by separate joint 15, and with the vehicle body by an additional joint 16. The upper wheel suspension link 2 of the first embodiment comprises an opened-up A-frame arm arrangement formed by two control arms 17 and 18, the A-frame arm arrangement being pivoted by way of two joints 19 and 20 at the wheel carrier 9 and by way of two additional joints 21 and 22, at the vehicle body. The actuator element 6 is connected with the rear second control arm 13 of the A-frame arm arrangement 3 by a control bearing 11 which has a designed elasticity in at least a direction which is transverse to the vehicle, as shown in the figures of the drawing, and which is formed, for example, by a joint.

FIGS. 2 through 8 are diagrammatic representations of alternative embodiments of the suspension system of FIG. 1, in which corresponding elements are designated by the same reference numerals.

Figure 2:
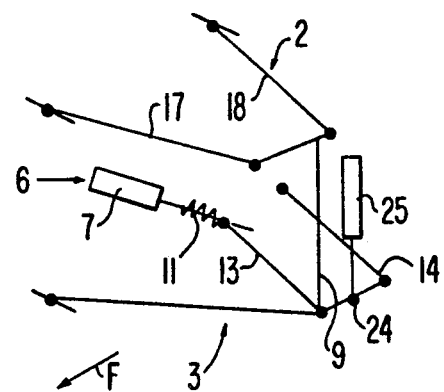
FIGS. 2 through 7 are diagrammatic representations of alternative embodiments of a wheel suspension system having an upper opened-up wishbone and a lower A-frame arm arrangement, wherein the rod link may be arranged in front of or behind the A-frame arm arrangement, and the adjusting element is applied either to one of the control arms of the A-frame arm arrangement or to the rod link.

FIG. 2 depicts an embodiment which corresponds essentially to the construction according to FIG. 1, and shows in addition the lower support point 24 of a spring and shock absorber strut 25 at the wheel carrier 9. According to the embodiment of FIG. 3, the actuator element 6 may be connected with the rod link 14 which is arranged in the same position relative to the A-frame arm arrangement as shown in FIG. 2, and has a spring or shock absorber strut 25 supported at the wheel carrier 9. In an embodiment illustrated in FIG. 4, the rod link 14 is arranged in front of the A-frame arm arrangement 3, the front first control arm 12 being connected with the actuator element 7.

Figure 3:
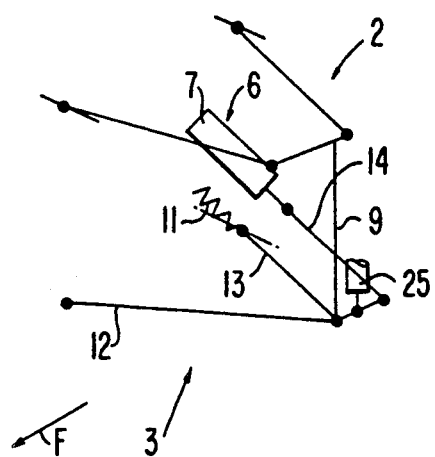
Figure 4:
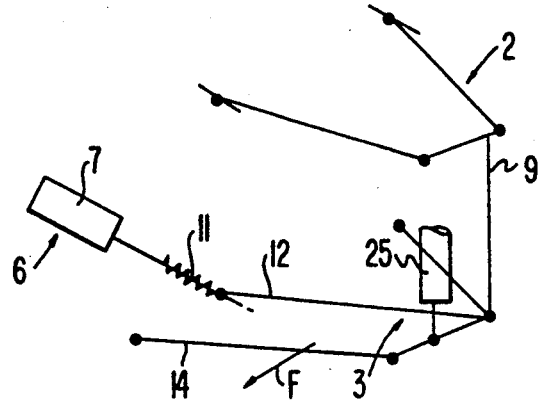
Figure 5:
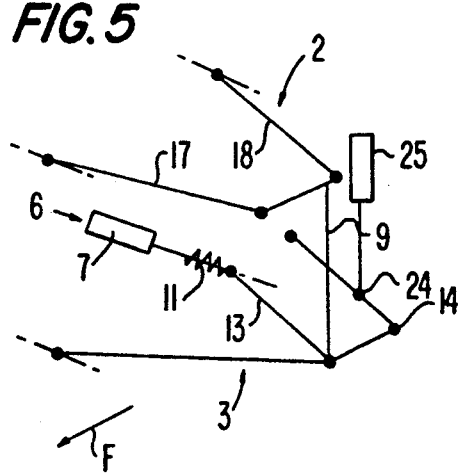
Figure 6:
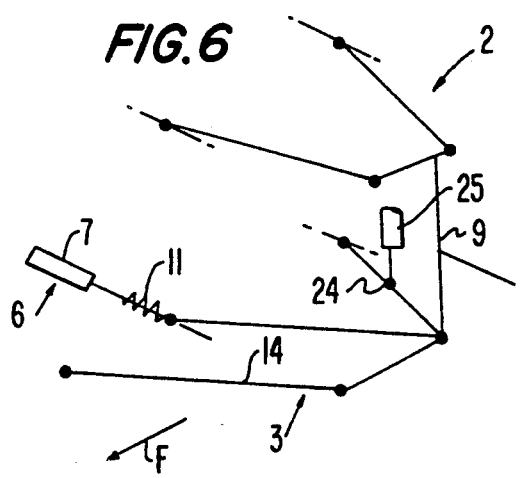
Figure 7:
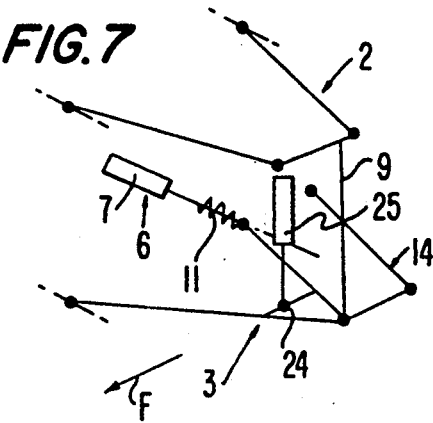

In FIG. 5, the arrangement of the rod link 14 is the same as the embodiments of FIGS. 2 and 3. The actuator element 6 is connected with the rear second control arm 13 of the A-frame arm arrangement 3, and the spring and shock absorber strut 25 is supported at the rod link 14. In another embodiment illustrated in FIG. 6, the arrangement of the rod link 14 is the same as the embodiment of FIG. 4, with the adjusting element 6 being connected with the front first control arm 12, and the spring and shock absorber strut 25, being supported at the second rear control arm 13. According to still another embodiment illustrated in FIG. 7, the spring and shock absorber strut 25 is supported between the two control arms 12, 13 of the wishbone 3.

While in each of the foregoing embodiments, the rod link 14 is disposed in parallel with the adjacent control arm, it may also be arranged at an angle with respect to the adjacent control arm. That is, it may be arranged to be diverging either to the interior or to the exterior side. As outlined by a dash-dotted line in FIG. 1, in a variation, the steering device 7 is arranged between the respective rod links 14. However, it is also possible to provide two actuator cylinders which are each connected with one of the rod links. The actuator cylinder or cylinders may also take up positions other than shown, for example, in the longitudinal direction, so that the rod link 14 is acted upon by way of a deflecting device.

Figure 8:
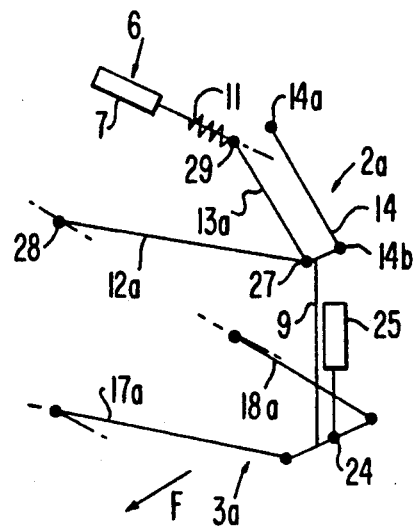
FIGS. 8 to 10 are diagrammatic representations of alternative embodiments of a wheel suspension system having an upper A-frame arm arrangement with a rod link and a lower opened-up wishbone, in which case the adjusting element is connected with one of the control arms of the upper A-frame arm arrangement or with the rod link.
Figure 9:
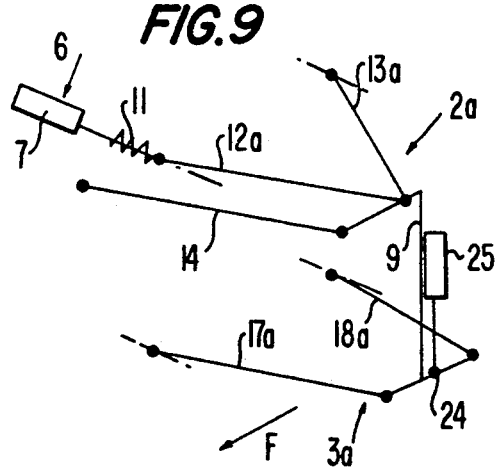
Figure 10:
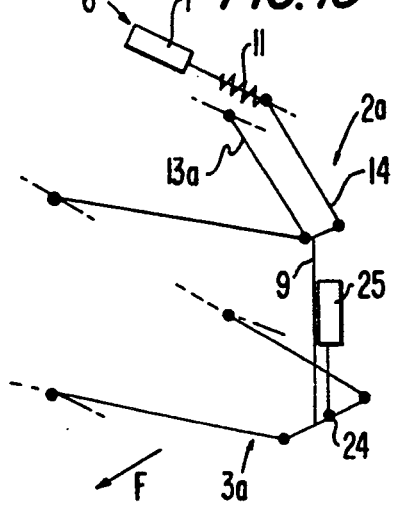

According to other embodiments of FIGS. 8 to 10, the upper wheel suspension link 2a comprises an A-frame arm arrangement as well as the additional rod link 14. The A-frame arm arrangement is pivotally connected to the wheel carrier 9 by way of a joint 27 and to the vehicle body by way of additional joints 28 and 29, the rod link 14 being supported by way of a first wheel-carrier-side bearing 14b and by way of a second body-side bearing 14a. In the case of the embodiment according to FIG. 8, the second control arm 13a, which is in the rear, is connected with the actuator element 6, and the rod link 14 is arranged adjacent to the second control arm 13.

According to the embodiment of FIG. 9, the rod link 14 is arranged in front of the upper wheel suspension link 2a, and the actuator element 6 is connected with the front first control arm 12a. In FIG. 10, the rod link 14 is arranged behind the rear second control arm 13a of the upper wheel suspension link 2a, and is connected with the actuator element 6. In each case, the control bearing 11 is provided at a control arm of the wheel suspension link 2, 3 and 2a, 3a so that the adjustment of a rear-wheel steering angle is ensured.

Referring once again to FIG. 1, the longitudinal axes 30, 31 of control arms 17 and 18 of the upper wheel suspension link 2, and the longitudinal axes 32, 33 of the control arms 12 and 13 of the lower suspension arm link 3, each form an intersecting point 34, 35, through which a resilient swivel axis 36 extends, so that a center of rotation 38 is established in the wheel contact plane at a point which is behind the vertical wheel center transverse plane 39 and outside the wheel track S. When forces act upon the wheel from the outside, the wheel will swivel around this wheel center of rotation 38 and, depending on the connection of the adjusting element 6 with one of the wishbones 2, 3 or 2a, 3a or with the rod link 14, (as shown in the various alternative embodiments of FIGS. 1 through 10) will swivel around an axis which is formed by the A-frame arm arrangement.

Steering of the rear wheels 4 and 5, is effected by operation the actuator element 6 of the steering device 7 (which is connected, for example, with the rod link 14 in the construction according to FIG. 3). The rod link 14 is arranged behind the vertical wheel center transverse plane so that wheels 4 and 5 swivel around a steering axis of rotation L which extends through point 34, as well as through the bearing 8 of the A-frame arm arrangement 3.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A wheel suspension system for a steerable rear wheel of a motor vehicle comprising:
   a wheel carrier on which said wheel is rotatably mounted;
   upper and lower suspension links arranged respectively above and below an axis of rotation of said wheel, and coupling said wheel carrier with a body of said motor vehicle;
   said upper suspension link consisting of an opened-up A-frame arrangement;
   said lower suspension link being coupled to said wheel carrier by a wheel carrier joint, and consisting of an A-frame arrangement having at least one A-frame arm which is coupled to the vehicle body by a control bearing having a designed elasticity in a transverse direction relative to said vehicle body;
   a rod link arranged rearward, relative to a forward direction of motion of said vehicle, of said A-frame arm of said lower suspension link and being connected at a first end thereof to said wheel carrier by a rotatable joint adjacent said wheel carrier joint;
   a steering-adjusting element operatively coupled between a second end of said rod link and said vehicle body;
   said wheel carrier being pivotable by said steering adjusting element, by means of elastic deformation of said control bearing, about a steering axis which extends through said wheel carrier joint and through a first intersecting point of longitudinal axes of A-frame arms of said upper suspension link;
   said wheel also being pivotable about an elastokinematic swivel axis which extends through said first intersecting point and through a second intersection point of longitudinal axes of the rod link and a forward A-frame arm of said lower suspension link.

2. A wheel suspension system according to claim 1, wherein said elastokinematic swivel axis defines a center of rotation for said wheel that is rearward of a vertical wheel center transverse plane, and outward of a wheel track of said wheel.

3. A wheel suspension system according to claim 1, wherein a spring a shock absorber strut is supported on the wheel carrier at a lower end thereof, between a rearward A-frame arm thereof and said joint connected to said rod link.

4. A wheel suspension system for a steerable rear wheel of a motor vehicle comprising:
- a wheel carrier on which said wheel is rotatably mounted;
- first and second suspension links, one of which is arranged above an axis of rotation of said wheel and the other of which is arranged below said axis of rotation, said suspension links, coupling said wheel carrier with a body of said motor vehicle;
- said first suspension link consisting of an opened-up A-frame arrangement;
- said second suspension link being coupled to said wheel carrier by a wheel carrier joint, and consisting of an A-frame arrangement having at least one A-frame arm which is coupled to the vehicle body by a control bearing having a designed elasticity in a transverse direction relative to said vehicle body;
- a rod link arranged rearward, relative to a forward direction of motion of said vehicle, of said A-frame arm of said second lower suspension link and being connected at a first end thereof to said wheel carrier by a rotatable joint adjacent said wheel carrier joint;
- a steering-adjusting element operatively coupled between a second end of said rod link and said vehicle body;
- said wheel carrier being pivotable by said steering adjusting element, by means of elastic deformation of said control bearing, about a steering axis which extends through said wheel carrier joint and through a first intersecting point of longitudinal axes of A-frame arms of said first suspension link;
- said wheel also being pivotable about an elastokinematic swivel axis which extends through said first intersecting point and through a second intersection point of longitudinal axes of the rod link and a forward A-frame arm of said second suspension link.

5. A wheel suspension system according to claim 3, wherein said first suspension link is an upper suspension link, and said second suspension link is a lower suspension link.

6. A wheel suspension system according to claim 3, wherein said first suspension link is a lower suspension link, and said second suspension link is an upper suspension link.

7. A wheel suspension system according to claim 1, wherein said steering adjusting element is disposed transversely to a longitudinal axis of said vehicle and moves said rod link in a transverse direction.

8. A wheel suspension system according to claim 4, wherein said steering adjusting element is disposed transversely to a longitudinal axis of said vehicle and moves said rod link in a transverse direction.

9. A wheel suspension system according to claim 4, wherein said steering adjusting element is operatively coupled to rod links which are coupled to first and second rear wheels of a motor vehicle.

* * * * *